United States Patent
Fukazawa et al.

(10) Patent No.: US 10,280,086 B2
(45) Date of Patent: May 7, 2019

(54) NEGATIVE THERMAL EXPANSION MATERIAL AND COMPOSITE MATERIAL COMPRISING SAME

(71) Applicant: Nippon Chemical Industrial Co., Ltd., Tokyo (JP)

(72) Inventors: Junya Fukazawa, Tokyo (JP); Toru Hata, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 15/759,333

(22) PCT Filed: Oct. 4, 2016

(86) PCT No.: PCT/JP2016/079397
§ 371 (c)(1),
(2) Date: Mar. 12, 2018

(87) PCT Pub. No.: WO2017/061403
PCT Pub. Date: Apr. 13, 2017

(65) Prior Publication Data
US 2018/0251376 A1    Sep. 6, 2018

(30) Foreign Application Priority Data

Oct. 7, 2015 (JP) ................ 2015-199000
Jun. 23, 2016 (JP) ................ 2016-124308
Sep. 30, 2016 (JP) ................ 2016-192427

(51) Int. Cl.
| | | |
|---|---|---|
| C01B 25/00 | (2006.01) | |
| C01B 25/45 | (2006.01) | |
| C04B 14/36 | (2006.01) | |
| B01J 2/06 | (2006.01) | |
| C09C 1/00 | (2006.01) | |
| C04B 35/00 | (2006.01) | |
| C04B 22/00 | (2006.01) | |
| C01B 25/37 | (2006.01) | |
| C04B 103/52 | (2006.01) | |

(52) U.S. Cl.
CPC ............ C01B 25/45 (2013.01); B01J 2/06 (2013.01); C04B 14/366 (2013.01); C04B 22/008 (2013.01); C04B 35/00 (2013.01); C09C 1/00 (2013.01); *C01B 25/372* (2013.01); *C01P 2002/74* (2013.01); *C01P 2004/32* (2013.01); *C01P 2004/45* (2013.01); *C01P 2004/61* (2013.01); *C01P 2006/11* (2013.01); *C01P 2006/12* (2013.01); *C01P 2006/32* (2013.01); *C04B 2103/52* (2013.01)

(58) Field of Classification Search
CPC ............................. C01B 25/45; C01B 25/372
USPC ......................................................... 423/306
See application file for complete search history.

(56) References Cited

U.S. PATENT DOCUMENTS

| | | | |
|---|---|---|---|
| 6,187,700 B1 | 2/2001 | Merkel | |
| 8,133,829 B2 * | 3/2012 | Ide | C03C 3/066 501/17 |
| 2009/0247385 A1 | 10/2009 | Ide | |
| 2016/0068728 A1 * | 3/2016 | Akulichev | C08K 3/01 524/406 |

FOREIGN PATENT DOCUMENTS

| | | | |
|---|---|---|---|
| CN | 101891470 | * | 11/2010 |
| CN | 102433454 A | | 5/2012 |
| JP | 2002-517377 A | | 6/2002 |
| JP | 2005-35840 A | | 2/2005 |
| JP | 2009-256183 A | | 11/2009 |
| JP | 2014-19628 A | | 2/2014 |
| JP | 2015-10006 A | | 1/2015 |
| WO | 2008/007504 A1 | | 1/2008 |
| WO | 2014/177720 | * | 11/2014 |
| WO | 2017/061402 | * | 4/2017 |

OTHER PUBLICATIONS

Translation of CN 101891470A. (Year: 2010).*
International Search Report dated Dec. 6, 2016, issued in counterpart application No. PCT/JP2016/079397. (2 pages).
Decision to Grant a Patent dated Jan. 31, 2017, Issued in counterpart Japanese Patent Application No. 2016-192427, w/English translation. (6 pages).

(Continued)

Primary Examiner — Steven J Bos
(74) Attorney, Agent, or Firm — Westerman, Hattori, Daniels & Adrian, LLP (57) ABSTRACT

The present application provides a negative thermal expansion material having excellent dispersibility and packing properties in a positive thermal expansion material. The negative thermal expansion material of the present invention comprises spherical zirconium tungsten phosphate having a BET specific surface area, of 2 m$^2$/g or smaller. The degree of sphericity is preferably 0.90 or more and 1 or less. Also preferably, the negative thermal expansion material further contains at least Mg and/or V as a subcomponent element. Also preferably, the content of the subcomponent element is 0.1% by mass or more and 3% by mass or less. Also preferably, the average particle size is 1 μm or larger and 50 μm smaller.

11 Claims, 4 Drawing Sheets (56) References Cited

OTHER PUBLICATIONS

Shang et al., "Effect of MgO and PVA on the Synthesis and Properties of Negative Thermal Expansion Ceramics of $Zr_2(WO_4)(PO_4)_2$", International Journal of Applied Ceramic Technology, Sep. 2013, vol. 10, No. 5, pp. 849-856, cited in ISR and Japanese Decision to Grant a Patent. (8 pages).

Isobe et al., "Preparation and properties of negative thermal expansion $Zr_2WP_2O_{12}$ ceramics", Materials Research Bulletin, Nov. 2009, vol. 44, No. 11, pp. 2045-2049, cited in ISR, the specification and Japanese Decision to Grant a Patent. (5 pages).

* cited by examiner

NEGATIVE THERMAL EXPANSION MATERIAL AND COMPOSITE MATERIAL COMPRISING SAME

TECHNICAL FIELD

The present invention relates to a negative thermal expansion material which shrinks in response to temperature elevation, and a composite material containing the same.

BACKGROUND ART

Many substances increase their lengths or volumes due to thermal expansion as the temperature elevates. By contrast, materials exhibiting negative thermal expansion (hereinafter, also referred to as "negative thermal expansion materials") are also known which rather decrease their volumes when warmed. It is known that the materials exhibiting negative thermal expansion can be used with other materials to suppress change in the thermal expansion of the materials caused by change in temperature.

For example, β-eucryptite, zirconium tungstate ($ZrW_2O_8$), zirconium tungsten phosphate ($Zr_2WO_4(PO_4)_2$), $Zn_xCd_{1-x}(CN)_2$, manganese nitride, and bismuth-nickel-iron oxide are known as the materials exhibiting negative thermal expansion.

The zirconium tungsten, phosphate has large negative thermal expansivity with a linear expansion coefficient of −3.4 to −3.0 ppm/° C. in the temperature range of 0 to 400° C. and can be used in combination with a material exhibiting positive thermal expansion (hereinafter, also referred to as a "positive thermal expansion material") to produce a low thermal expansion material.

As for method for producing the zirconium tungsten phosphate, for example, Patent Literature 1 described below has proposed a method which comprises mixing zirconium phosphate, tungsten oxide and a reaction accelerator such as MgO in a wet ball mill, and calcining the obtained mixture at 1200° C. Patent Literature 2 described below has proposed a method which comprises wet-mixing a phosphorus source such as ammonium phosphate, a tungsten source such as ammonium tungstate and a zirconium source such as zirconium chloride, followed by calcination. Non Patent Literature 1 described below has proposed, for example, a method which comprises calcining a mixture containing zirconium oxide, tungsten oxide and ammonium dihydrogen phosphate at 1200° C. However, the particle shape of the zirconium tungsten phosphate produced according to Patent Literatures 1 and 2 and Non Patent Literature 1 is a fractured shape. As far as the present inventor is aware, no spherical zirconium tungsten phosphate has been reported.

CITATION LIST

Patent Literature

Patent Literature 1: Japanese Patent Laid-Open No. 2005-35840, claim 3, paragraph 0035.
Patent Literature 2: Japanese Patent Laid-Open No. 2015-10006, paragraphs 0023 and 0025.

Non Patent Literature

Non Patent Literature 1: Materials Research Bulletin, 44 (2009), 2045-2049.

SUMMARY OF INVENTION

Technical Problem

Zirconium tungsten phosphate serving as a negative thermal expansion material is regarded as being promising as a member for ultraprecision machining.

Usually, a negative thermal expansion material is contained, for use, in a positive thermal expansion material such as a metal, an alloy, a glass, a ceramic, a resin, or a rubber. There is a demand for the development of a negative thermal expansion material having excellent dispersibility and packing properties in a positive thermal expansion material. Particularly, when zirconium tungsten phosphate is blended as a negative thermal expansion material in a large amount with a resin, the resulting resin easily has a high viscosity during shape forming. Unfortunately, the thermal expansion of a resin is difficult to suppress because a sufficient amount of zirconium tungsten phosphate cannot be blended with the resin.

Accordingly, an object of the present invention is to provide a negative thermal expansion material having excellent dispersibility and packing properties in a positive thermal expansion material, and a composite material comprising the same.

Solution to Problem

The present inventor has conducted diligent studies in light of the actual situation described above and consequently completed the present invention by finding that: spherical zirconium tungsten phosphate is obtained by a method having step A of heat-treating slurry containing a zirconium compound selected from zirconium hydroxide and zirconium carbonate, phosphoric acid and a tungsten compound, step B of subsequently subjecting the slurry after the step A to wet milling treatment in a media mill, step C of subsequently subjecting the slurry after the step B to spray drying treatment to obtain a spherical reaction precursor, and step D of subsequently calcining the spherical reaction precursor; the spherical zirconium tungsten phosphate has excellent negative thermal expansivity; and the spherical zirconium tungsten phosphate having a BET specific surface area in a specific range keeps the viscosity of a resin low during shape forming even when blended with the resin, is excellent in packing properties in such a way that a sufficient amount of the zirconium tungsten phosphate can be blended with a resin, and is also excellent in dispersibility.

Specifically, a first aspect to be provided by the present invention is a negative thermal expansion material comprising spherical zirconium tungsten phosphate having a BET specific surface area of 2 $m^2/g$ or smaller.

A second aspect to be provided by the present invention is a composite material comprising the negative thermal expansion material of the first aspect and a positive thermal expansion material.

Advantageous Effects of Invention

The present invention can provide a negative thermal expansion material comprising zirconium, tungsten phosphate having excellent dispersibility and packing properties in a positive thermal expansion material.

DESCRIPTION OF EMBODIMENTS

Hereinafter, the present invention will be described with reference to preferred embodiments thereof. The negative thermal expansion material of the present invention comprises spherical zirconium tungsten phosphate having a BET specific surface area of 2 m$^2$/g or smaller. The negative thermal expansion material having such a configuration has excellent dispersibility and packing properties in a positive thermal expansion material.

The present inventor has found that zirconium tungsten phosphate having the configuration described above can decrease the interaction between a resin and the negative thermal expansion material in kneading with the resin, for example, as compared with use of conventional fractured zirconium tungsten phosphate, and reduce the viscosity of a resin composition during shape forming.

The conventional fractured zirconium tungsten phosphate has a fragile moiety with small particle strength ascribable to the particle shape. Therefore, in the case of using, for example, a composite material of a glass powder and the zirconium tungsten phosphate as a sealing material, the hard glass powder collides strongly with the zirconium tungsten phosphate particles during the mixing treatment of the glass powder and the zirconium tungsten phosphate so that the zirconium tungsten phosphate particles are easily cracked from the fragile moieties of the particles to generate finer particles. These finer particles and the glass powder are melted together in a heat treatment step, disadvantageously resulting in reduction in the flowability of the sealing material. By contrast, the spherical zirconium tungsten phosphate for use as the negative thermal expansion material of the present invention is spherical particles and therefore also has the advantage that the generation of finer particles can be suppressed during the mixing treatment with a hard material.

In the present invention, the spherical zirconium tungsten phosphate means that, when the zirconium tungsten phosphate is used in the state of monodispersed primary particles as the negative thermal expansion material, the particle shape of the zirconium tungsten phosphate particles themselves is a spherical shape as the primary particles. Also, the spherical zirconium tungsten phosphate means that, when the zirconium tungsten phosphate is used in the state of particle aggregates which are secondary particles formed by the gathering of fine primary particles as the negative thermal expansion material, the shape of the particle aggregates themselves is a spherical shape.

In the present invention, the spherical zirconium tungsten phosphate is not necessarily required to be truly spherical. The degree of sphericity of the spherical zirconium tungsten phosphate is in the range of preferably 0.90 or more and 1 or less, more preferably 0.93 or more and 1 or less. Such spherical zirconium tungsten phosphate is preferred from the viewpoint of being excellent in dispersibility and packing properties in a positive thermal expansion material.

In the present invention, the degree of sphericity described above is calculated from parameters obtained by the image analysis processing of 50 particles arbitrarily extracted when a sample is observed under an electron microscope with a magnification of ×400. Specifically, the degree of sphericity is represented by an average value of 50 particles determined according to the following calculation expression (1):

$$\text{Degree of sphericity} = \text{Equivalent surface area diameter/Circumscribed circle diameter} \quad (1)$$

Equivalent surface area diameter: the diameter of a circle, whose circumference corresponds to the perimeter of a particle Circumscribed circle, diameter: the longest diameter of the particle.

Examples of an image analysis apparatus for use in the image analysis processing include LUZEX (manufactured by NIRECO Corp.) and PITA-04 (manufactured by SEISHIN ENTERPRISE Co., Ltd.). A degree of sphericity closer to 1 means that the shape is closer to a true sphere.

A feature of the spherical zirconium tungsten phosphate for use as the negative thermal expansion material of the present invention is that the BET specific surface area is 2.0 m$^2$/g or smaller.

In the negative thermal expansion material of the present invention, when the BET specific surface area falls within the range described above, the interaction of the negative thermal expansion material, particularly, with a resin can be smaller, resulting in excellent, dispersibility in the resin. On the other hand, if the BET specific surface area of the spherical zirconium tungsten phosphate is larger than 2.0 m$^2$/g, this is not preferred, for example, because: the interaction with a resin is increased during kneading with the resin; the viscosity of the resin is increased during shape forming; and dispersibility and packing properties in the resin are deteriorated. In the present invention, the BET specific surface area is preferably 0.01 m$^2$/g or larger and 2.0 m$^2$/g or smaller, more preferably 0.01 m$^2$/g or larger and 1.5 m$^2$/g or smaller, further preferably 0.01 m$^2$/g or more and 1.2 m$^2$/g or smaller, from the viewpoint of further improving dispersibility and packing properties in a positive thermal expansion material. In order to achieve the BET specific surface area in such a range, for example, a calcination temperature and a calcination time can be adjusted for a preferred method for producing the zirconium tungsten phosphate as mentioned later.

The spherical zirconium tungsten phosphate for use as the negative thermal expansion material in the present invention preferably contains a solid solution of at least Mg and/or V as a subcomponent element (hereinafter, also simply referred to as a "subcomponent element") from the viewpoint of improving dispersibility and packing properties in a resin. In the present invention, the phrase "containing at least Mg and/or V as a subelement component" means that Mg and/or V is essentially contained as the subcomponent element, and an additional subcomponent element other than Mg and/or V may also be contained.

Examples of the additional subelement component other than Mg and/or V include Zn, Cu, Fe, Cr, MB, Ni, Li, Al, B, Na, K, F, Cl, Br, I, Ca, Sr, Ba, Ti, Hf, Nb, Ta, Y, Yb, Si, S, Mo, Co, Bi, Te, Pb, Ag, Cd, In, Sn, Sb, Ga, Ge, La, Ce, Nd, Sm, Eu, Tb, Dy and Ho. These components may be used singly or in combinations of two or more.

In the present invention, the subcomponent element is preferably only Mg and/or V. Particularly, combined use of Mg and V is preferred from the viewpoint of being also excellent in the degree of sphericity and also improving dispersibility and packing properties in a positive thermal expansion material.

The content of the subcomponent element is preferably 0.1% by mass or more and 3% by mass or less, more preferably 0.2% by mass or more and 2% by mass or less, from the viewpoint of having excellent negative thermal expansivity and being excellent in dispersibility and packing properties. For combined use of Mg and V, the molar ratio of V to Mg (V/Mg) is preferably 0.1 or more and 2.0 or less, more preferably 0.2 or more and 1.5 or less, from the viewpoint of enhancing the synergistic effect of Mg and V.

The average particle size of the spherical zirconium tungsten phosphate for use as the negative thermal expansion material of the present invention is preferably 1 μm or larger and 50 μm or smaller, more preferably 2 μm or larger and 30 μm or smaller, from the viewpoint of packing properties in a positive thermal expansion material. The average particle size is an average value of 50 or more arbitrarily extracted particles measured by scanning electron microscope observation.

When the spherical zirconium tungsten phosphate is used in the state of monodispersed primary particles as the negative thermal expansion material, the average particle size of the spherical zirconium tungsten phosphate is an average particle size of the zirconium tungsten phosphate particles themselves as the primary particles. On the other hand, when the zirconium tungsten phosphate is used in the state of particle aggregates which are secondary particles formed by the gathering of fine primary particles as the negative thermal expansion material, the average particle size of the spherical zirconium tungsten phosphate is an average particle size of the particle aggregates themselves. Hereinafter, the simple term "average particle size" follows this definition.

The tap density of the spherical zirconium tungsten phosphate for use as the negative thermal expansion material of the present invention is preferably 1.3 g/ml or larger, more preferably 1.5 g/ml or larger and 2.5 g/ml or smaller, from the viewpoint of packing properties in a positive thermal expansion material.

In the present invention, the tap density refers to packing properties in a state where the negative thermal expansion material is spontaneously mixed without being particularly pressurized. The tap density is determined by placing approximately 50 g or more and 70 g or less of a sample in a graduated cylinder, loading the graduated cylinder in an automatic T.D measurement apparatus, and setting measuring conditions to the number of taps of 500, a tapping height of 3.2 mm, and a tapping pace of 200 taps/min (conforming to ASTM: B527-93, 85).

The bulk density of the spherical zirconium tungsten phosphate for use as the negative thermal expansion material of the present invention is preferably 0.8 g/ml or larger, more preferably 1.0 to 1.6 g/ml, from the viewpoint of further improving packing properties in a positive thermal expansion material.

In the present invention, the bulk density is a mass per unit, volume when a given container is packed with a powder by free fall. The bulk density can be measured in conformity with JIS K 5101-12-1: 2004. Specifically, the bulk density can be measured using, for example, a bulk specific gravity measuring instrument (manufactured by Kuramochi Kagaku Kikai Seisakusho K.K.).

The negative thermal expansion material of the present invention may be a mixture of crude particles of the spherical zirconium tungsten phosphate and fine particles smaller than the crude particles in order to further improve packing properties. The average particle size of the crude particles of the spherical zirconium tungsten phosphate is preferably 5 μmum or larger, more preferably 5 μm or larger and 30 μm or smaller. On the other hand, the average particle size of the fine particles of the spherical zirconium tungsten phosphate is preferably smaller than 5 μm, more preferably 1 μm or larger and 4 μm or smaller. The average particle size is an average value of 50 or more arbitrarily extracted particles measured by scanning electron microscope observation.

The blending ratio between the crude particles of the spherical zirconium tungsten phosphate and the fine particles of the spherical zirconium tungsten phosphate can foe adjusted such that the tap density and the bulk density fall within the ranges described above.

The angle of repose of the negative thermal expansion material of the present invention is preferably 50° or smaller, more preferably 30° or larger and 50° or smaller, particularly preferably 38° or larger and 48° or smaller, from the viewpoint of packing properties and dispensability in a positive thermal, expansion material.

In the present invention, the angle of repose is an angle formed by the slope of an inclined plane and a horizontal plane on which a powder piled by free fall is on the verge of sliding down due to its own weight. Specifically, the angle of repose can be measured using a measurement apparatus such as a powder tester (model PT-N manufactured by Hosokawa Micron Group).

The spherical zirconium tungsten phosphate for use as the negative thermal expansion material in the present invention is preferably particle aggregates which are secondary particles formed by the gathering of primary particles. The particle aggregates have the void between the primary particles and therefore have a small specific gravity of the particles themselves as compared with the spherical zirconium tungsten phosphate used in the state of monodispersed primary particles. Therefore, difference in specific gravity from a resin can be decreased. This can inhibit the negative thermal expansion material from precipitating in a resin. In the present, invention, the "primary particle" is an object confirmed as a minimum unit as a particle by assessment from an apparent geometric form.

Particularly, the particle aggregates for use as the negative thermal, expansion material have a spherical shape having a BET specific surface area of preferably 1.2 $m^2/g$ or smaller, more preferably 0.01 $m^2/g$ or larger and 1.2 $m^2/g$ or smaller, particularly 0.01 $m^2/g$ or larger and 1 $m^2/g$ or smaller. In such a case, the void between the primary particles on the surface of the particle aggregates is kept low, while voids are present the inside of the particle aggregates. Therefore, the interaction between a resin and the negative thermal expansion material can be smaller, resulting in further improvement in dispersibility in the resin.

When the spherical zirconium tungsten phosphate is particle aggregates, the average particle size of the primary particles determined by scanning electron microscope observation is preferably 3 μm or smaller, more preferably 0.1 μm or larger and 2 μm or smaller, from the viewpoint of keeping the particles spherical. The average particle size of the primary particles is an average value of 50 or more arbitrarily extracted particles measured by scanning electron microscope observation.

Next, a preferred method for producing the negative thermal expansion material of the present, invention will be described. The method for producing the negative, thermal expansion material of the present invention preferably comprises the following steps:

step A of heat-treating slurry containing a zirconium compound selected from zirconium hydroxide and zirconium carbonate, phosphoric acid and a tungsten compound;

step B of subjecting the slurry after the step A to wet milling treatment in a media mill;

step C of subjecting the slurry after the step B to spray drying treatment to obtain a spherical reaction precursor; and step D of calcining the spherical reaction precursor.

In the present production method, a compound containing a subcomponent element, selected from at least a magnesium compound and/or a vanadium compound can be added before the step A to the step B. Hereinafter, each step will be described.

[Step A]

In this step, slurry containing a zirconium compound selected from zirconium hydroxide and zirconium carbonate, phosphoric acid, and a tungsten compound is heat-treated. As mentioned later, a compound containing a sub-component element is added before the step A to the step B.

In the case of preparing a slurry containing the tungsten compound uniformly dispersed in advance and then adding thereto the phosphoric acid and the zirconium, compound, the resulting slurry tends to be highly viscous due to the tungsten compound so that the uniform mixing treatment of each starting material is difficult. To solve this problem, the present inventor has found that, by the heat treatment of a slurry containing a tungsten compound, phosphoric acid and a zirconium compound, the resulting slurry is low viscous and permits wet milling treatment in a media mill.

The zirconium compound for use in the step A is at least one of zirconium hydroxide and zirconium carbonate. The zirconium compound can be used without particular limitations as long as the zirconium compound is industrially available. The zirconium compound may be an anhydrous salt or a hydrate salt. The zirconium carbonate for use as the zirconium compound may be a basic salt and may be a double salt of ammonia, sodium, potassium, or the like. The zirconium compound can be added directly as a powder to the slurry in the step A. Alternatively, the zirconium compound may be added thereto as a suspension of the zirconium compound dispersed in a water solvent or a solution of the zirconium compound dissolved in a water solvent.

The tungsten compound for use in the step A is preferably a compound insoluble or poorly soluble in water. Examples of such a tungsten compound include tungsten trioxide, ammonium tungstate and tungsten chloride. Among them, tungsten trioxide is preferred from the viewpoint of the industrially easy availability of a high pure product and easy handling.

The phosphoric acid for use in the step A is not particularly limited by its type as long as the phosphoric acid is industrially available. The phosphoric acid can be used as an aqueous solution.

The amount of the zirconium compound added to the slurry is an amount such that the molar ratio of a Zr element in the zirconium compound to a W element in the tungsten compound (Sr/W) in the slurry is preferably 1.7 or more and 2.3 or less, more preferably 1.9 or more and 2.1 or less, from the viewpoint of increasing the negative thermal expansion of the negative thermal expansion material.

The amount of the phosphoric acid added to the slurry is an amount such that the molar ratio of a P element in the phosphoric acid to a W element in the tungsten compound (Zr/W) in the slurry is preferably 1.7 or more and 2.3 or less, more preferably 1.9 or more and 2.1 or less, from the viewpoint of increasing the negative thermal expansion of the negative thermal expansion material.

The solvent for dispersing the tungsten compound, the phosphoric acid and the zirconium compound, for use in the step A is not only water but may be a mixed solvent of water and a hydrophilic solvent. The concentration of the slurry containing the solvent is preferably 5% by mass or higher and 50% by mass or lower, more preferably 10% by mass or higher and 30% by mass or lower, from the viewpoint that the resulting slurry has a viscosity that offers easy operability and handling.

In the step A, the order of addition of each starting material is not particularly limited and can be appropriately determined in consideration of a reaction apparatus, etc. It is particularly preferred to prepare slurry containing the tungsten compound and then add the phosphoric acid and the zirconium compound to the slurry, from the viewpoint of easier operability.

The heat treatment temperature of the slurry in the step A is preferably 40° C. or higher and 110° C. or lower, more preferably 60° C. or higher and 90° C. or lower, from the viewpoint that the resulting slurry has a viscosity that offers easy operability and handling.

The heat treatment time in the step A is not critical in the present production method, and the reaction can be performed for a sufficient time until the slurry viscosity is moderately decreased. In many cases, satisfactory low viscous slurry can be formed by heat treatment, for preferably 0.5 hours or longer, more preferably 1 hour or longer and 4 hours or shorter.

In the present production method, a compound containing a subcomponent element, selected from at least a magnesium compound and/or a vanadium compound (hereinafter, also simply referred to as a "compound containing a sub-component, element") can be added to the slurry before the step A to the step B, i.e., before the completion of the step B. Specifically, the compound containing a subcomponent, element is added at at least one timing among before the start of the step A, in the course of the step A, after the completion of the step A, before the start of the step B, and in the course of the step B.

Examples of the magnesium compound include an oxide, a hydroxide, a carbonate, an organic acid salt, a nitrate, a phosphate, a sulfate, a chloride, a bromide and an iodide of magnesium. Among them, an oxide or a hydroxide of magnesium is preferably used from the viewpoint of easily controlling the purity of the resulting negative thermal expansion material and easily obtaining a highly pure product.

Examples of the vanadium compound include an oxide, a hydroxide, a carbonate, an organic acid salt, an ammonium salt, a nitrate, a phosphate, a sulfate, a chloride, a bromide and an iodide of vanadium. Among them, an oxide or a hydroxide containing vanadium is preferably used from the viewpoint of easily controlling the purity of the resulting negative thermal expansion material and easily obtaining a highly pure product.

In the present production method, a compound containing an additional subcomponent element other than Mg and/or V can be used in combination therewith. In this case, the compound can be added to the slurry before the step A to the step B, i.e., before the step B, as in the addition of Mg and/or V.

Examples of the compound containing an additional subcomponent element other than Mg and/or V include compounds containing at least one subcomponent element-selected from Zn, Cu, Fe, Cr, Mn, Ni, Li, Al, B, Na, K, F, Cl, Br, I, Ca, Sr, Ba, Ti, Hf, Nb, Ta, Y, Yb, Si, S, Mo, Co, Bi, Te, Pb, Ag, Cd, In, Sn, Sb, Te, Ga, Ge, La, Ce, Nd, Sm, Eu, Tb, Dy and Ho. These compounds can be used singly or in combinations of two or more.

Examples of the compound containing an additional subcomponent element other than Mg and/or V include an oxide, a hydroxide, a carbonate, an organic acid salt, an ammonium salt, a nitrate, a phosphate, a sulfate, a chloride, a bromide and an iodide containing the subcomponent element. Among them, an oxide or a hydroxide containing the subcomponent element is preferably used from the viewpoint of easily controlling the purity of the resulting negative thermal expansion material and easily obtaining a highly pure product.

The pH of the slurry can be adjusted, if necessary, with an alkali or an acid for the purpose of dissolving or depositing the added compound containing a subcomponent element in the slurry.

The amount of the magnesium compound and the vanadium compound, and the optional compound containing a subcomponent element, added to the slurry is an amount that attains preferably 0.05% by mass or more and 5.0% by mass or less, more preferably 0.1% by mass or more and 3.0% by mass or less, of the subcomponent element in the resulting spherical reaction precursor.

The zirconium compound, the phosphoric acid, the tungsten compound and the compound containing a subcomponent element for use in this step are preferably highly pure products, respectively, for obtaining highly pure spherical zirconium tungsten phosphate.

[Step B]

In this step, the slurry after the step A is subjected to wet milling treatment in a media mill to obtain slurry containing each starting material dispersed finely and uniformly. For example, a bead mill, a ball mill, a paint shaker, an attritor or a sand mill can be used as the media mill. Particularly, a bead mill is preferably used. In this case, operation conditions and the type and size of beads can be properly selected according to the size or throughput of the apparatus.

A dispersant may be added to the slurry from the viewpoint of more efficiently performing the treatment using the media mill. The dispersant used can be properly selected according to the type of a dispersion medium. When the dispersion medium is, for example, water, any of various surfactants and polycarboxylic acid ammonium salt, etc. can be used as the dispersant. The concentration of the dispersant in the slurry is 0.01% by mass or higher and 10% by mass or lower, particularly, 0.1% toy mass or higher and 5% by mass or lower, from the viewpoint of enhancing a dispersing effect.

The wet milling treatment using the media mill is performed until the average particle size of solid matter determined by a laser diffraction/scattering method becomes preferably 2 μm or smaller, more preferably 1 μm or smaller, particularly preferably 0.1 or larger and 0.5 μm or smaller, from the viewpoint that a spherical reaction precursor having better reactivity can be obtained.

Low viscous slurry containing the subcomponent element and the starting material components W, P and Zr uniformly dispersed can toe prepared by the operation described above.

[Step C]

The slurry after the completion of the step B is subjected to the next step C without solid-liquid separation. In the step C, the slurry is spray-dried to obtain a spherical reaction precursor. In the spray drying method, the slurry is atomized by predetermined means, and the resulting fine liquid droplets are dried to obtain a spherical reaction precursor. The atomization of the slurry includes, for example, a method using a rotating disk and a method, using a pressure nozzle. In this step, any of the methods can be used.

In the spray drying method, the size of the liquid droplets obtained by the atomization is not particularly limited and is preferably 1 μm or larger and 40 μm or smaller, particularly preferably 5 μm or larger and 30 μm or smaller. The amount of the slurry supplied to a spray drying apparatus is desirably determined in consideration of this viewpoint.

The hot air temperature of the spray drying apparatus is preferably adjusted to 100° C. or higher and 270° C. or lower, more preferably 150° C. or higher and 230° C. or lower, from the viewpoint of preventing the moisture absorption of a powder and facilitating the recovery of the powder.

The spherical reaction precursor obtained by the spray drying is pellets containing the starting material components W, P and Zr which form zirconium tungsten phosphate.

The spherical reaction precursor obtained by this step preferably has an infrared absorption peak at least at 950 $cm^{-1}$ or more and 1150 $cm^{-1}$ or less. In this wavenumber range, the maximum value of the infrared absorption peak is preferably 1030 (±20) $cm^{-1}$. A reason for this is as described below.

Figure 1:
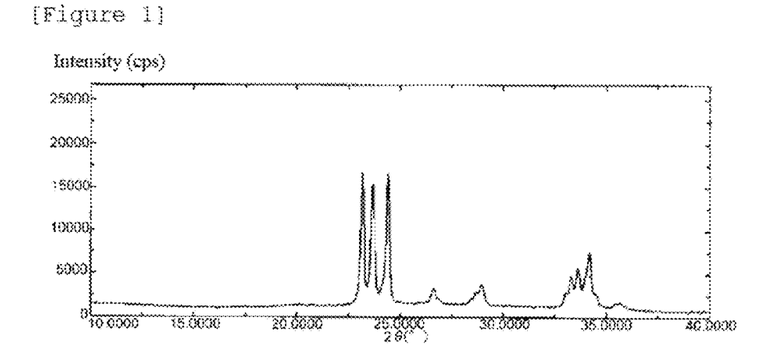
FIG. 1 is an X-ray diffraction diagram of a reaction precursor obtained in Reference Example 1.
Figure 2A:
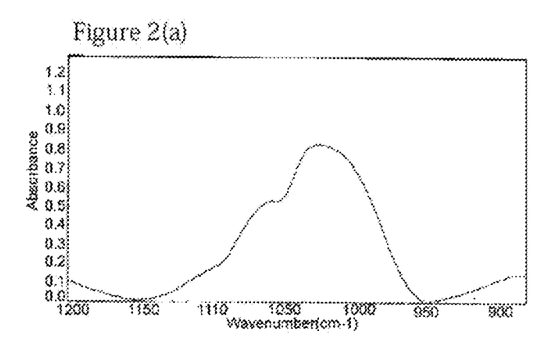
FIG. 2(a) is a FT-IR spectrum chart of the reaction precursor obtained in Reference Example 1.
Figure 2B:
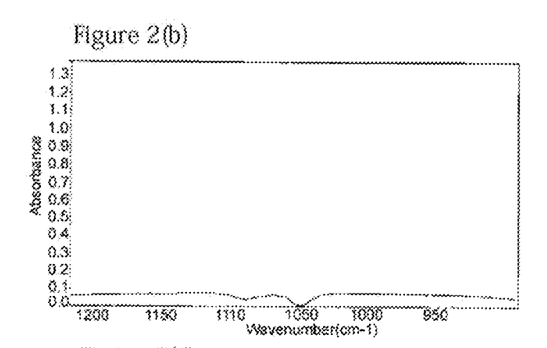
FIG. 2(b) is a FT-IR spectrum chart of zirconium hydroxide.
Figure 2C:
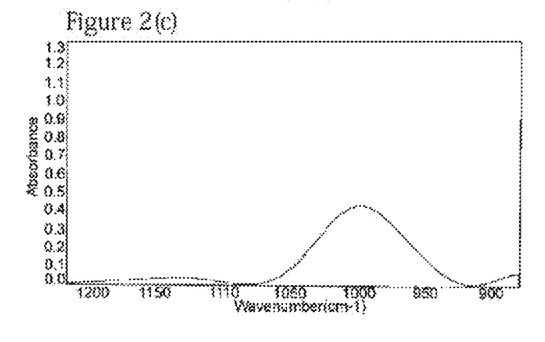
FIG. 2(c) is a FT-IR spectrum chart of phosphoric acid.
Figure 2D:
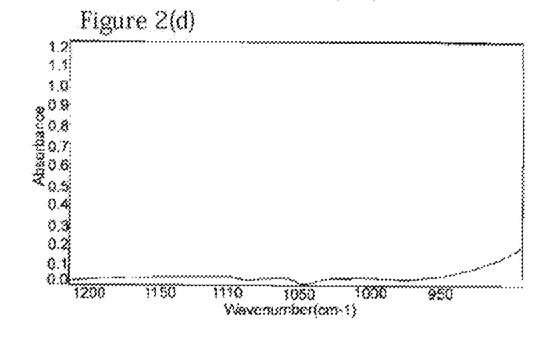
FIG. 2(d) is a FT-IR spectrum chart of tungsten trioxide.

As shown in Reference Example 1 mentioned later, when a reaction precursor containing no subcomponent element is obtained using phosphoric acid, tungsten trioxide and zirconium hydroxide, only the diffraction peaks of the tungsten trioxide are confirmed (see FIG. 1) by the X-ray diffractometry of the reaction precursor, whereas no diffraction peak of the zirconium hydroxide is observed. In the FT-IR analysis of the reaction precursor, the zirconium hydroxide and the phosphoric acid exhibit different infrared absorption peak patterns (see FIGS. 2(a) to 2(d)). It is therefore evident that the zirconium hydroxide and the phosphoric acid react readily in the slurry. Thus, the reaction precursor obtained by this step is considered to exhibit an infrared absorption peak pattern different from that of the starting materials through the reaction between the zirconium compound and the phosphoric acid in the step A. The present inventor speculates that an amorphous compound containing phosphorus and zirconium, obtained by the reaction between the phosphoric acid and the zirconium hydroxide is amorphous zirconium phosphate.

[Step D]

The step D is the step of calcining the spherical reaction precursor obtained in the step C to obtain the spherical, zirconium tungsten phosphate of interest. In the step D, the calcination temperature for calcining the spherical, reaction precursor is preferably 900° C. or higher and 1300° C. or lower. This is because at the calcination temperature set to 900° C. or higher tends to hinder an unreacted oxide, etc. from remaining and to easily produce zirconium tungsten phosphate exhibiting a single phase in X-ray diffraction, whereas the calcination temperature set to 1300° C. or lower tends to hinder clumps of consolidated particles from being generated and to easily produce a powder. In the present production method, zirconium tungsten phosphate exhibiting a single phase in X-ray diffraction can be obtained at a low temperature. In order to exploit this advantage, the calcination temperature is further preferably set to 900° C. or higher and 1100° C. or lower.

The calcination time is not critical in the present production method, and the reaction can be performed for a sufficient time until zirconium tungsten phosphate exhibiting a single phase in X-ray diffraction is formed. In many cases, zirconium tungsten phosphate having satisfactory physical properties can be formed by calcination for preferably 1 hour or longer, more preferably 2 hours or longer and 20 hours or shorter. The calcination atmosphere is not particularly limited and may be any of an inert gas atmosphere, a vacuum atmosphere, an oxidative gas atmosphere, and the atmosphere.

The calcination may be performed desired, times. Alternatively, the product once calcined may be milled and subsequently recalcined, for the purpose of equalizing powder characteristics.

The calcined product can be appropriately cooled, followed by milling, crushing, classification, etc. according to the need to obtain the zirconium tungsten phosphate of interest. This zirconium tungsten phosphate has a negative thermal expansion rate, exhibits a single phase in X-ray diffraction, and is spherical.

The negative thermal expansion material according to the present invention can be used as a powder or a paste. For use as the paste, the negative thermal expansion material can be used in the state of a paste with a liquid resin having a low viscosity. Alternatively, the negative thermal expansion material may be used in the state of a paste containing a solvent and optionally further containing a binder, a flux material and a dispersant, etc.

The amount of the negative thermal expansion material blended in the paste is not particularly limited and, in many cases, is preferably 5% by volume or larger and 65% by volume or smaller.

The paste containing the negative thermal expansion material of the present invention and further containing a binder and a flux material can be preferably used as, for example, a sealing material.

A general solvent in the art is used as the solvent in the paste. Examples thereof include N,N'-dimethylformamide, ethylene glycol, dimethyl sulfoxide, dimethyl carbonate, propylene carbonate, butyrolactone, caprolactone, N-methyl-2-pyrrolidone, butyl carbitol acetate, propylene glycol diacetate, α-terpineol, α-terpineol, γ-butyllactone, tetralin, ethyl acetate, isoamyl acetate, diethylene glycol monoethyl ether, diethylene glycol monoethyl ether acetate, benzyl alcohol, toluene, 3-methoxy-3-methyl butanol, triethylene glycol monomethyl ether, dipropylene glycol monomethyl ether, dipropylene glycol monobutyl ether, tripropylene glycol monomethyl ether, and tripropylene glycol monobutyl ether.

A general binder in the art is used as the binder in the paste. Examples thereof include nitrocellulose, ethylcellulose, polyethylene carbonate, polypropylene carbonate, acrylic acid ester, methacrylic acid ester, polyethylene glycol derivatives, and polymethylstyrene.

Examples of the flux material for use in the paste include low-melting-point glasses. A general flux material in the art is used. Examples, thereof include $PbO$—$B_2O_3$ glass, $PbO$—$SiO_2$—$B_2O_3$ glass, $Bi_2O_3$—$B_2O_3$ glass, $Bi_2O_3$—$SiO_2$—$B_2O_3$ glass, $SiO_2$—$B_2O_3$—$Al_2O_3$ glass, $SiO_2$—$B_2O_3$—$BaO$ glass, $SiO_2$—$B_2O_3$—$CaO$ glass, $ZnO$—$B_2O_3$—$Al_2O_3$ glass, $ZnO$—$SiO_2$—$B_2O_3$ glass, $P_2O_5$ glass, $SnO$—$P_2O_5$ glass, $Y_2O_5$—$P_2O_5$ glass, $V_2O_5$—$Mo_2O_3$ glass, and $V_2O_5$—$P_2O_5$—$TeO_2$ glass.

The negative thermal expansion material of the present invention is contained in a positive thermal expansion material to prepare a composite material. A negative thermal expansion, zero thermal expansion or low thermal expansion material can be obtained depending on the blending ratio of the negative thermal expansion material.

The negative thermal expansion material of the present invention may be used in combination with an additional negative thermal expansion material, or a filler that is used in the adjustment of a thermal expansion coefficient, without impairing the effect of the present invention. Examples of the additional negative thermal expansion material, or the filler that is used in the adjustment of a thermal expansion coefficient include, but are not particularly limited to, zirconium tungstate ($ZrW_2O_8$), $Zn_xCd_{1-x}(CN)_2$, manganese nitride, bismuth-nickel-iron oxide, zirconium phosphate, cordierite, zircon, zirconia, tin oxide, niobium oxide, quarts, β-quarts, β-spodumene, β-eucryptite, mullite, quartz glass, $NbZr(PO_4)_3$, and molten silica.

Examples of the positive thermal expansion material to contain the negative thermal expansion material, of the present, invention include various organic compounds and inorganic compounds.

Examples of the organic compounds can include rubbers, polyolefin, polycycloolefin, polystyrene, ABS, polyacrylate, polyphenylene sulfide, phenol resin, polyamide resin, polyimide resin, epoxy resin, silicone resin, polycarbonate resin, polyethylene resin, polypropylene resin, polyethylene terephthalate resin (PET resin) and polyvinyl chloride resin.

Examples of the inorganic compounds can include metals, alloys, silicon dioxide, graphite, sapphire, various glasses, concrete materials, and various ceramic materials.

Among them, the positive thermal expansion material is preferably at least one member selected from a metal, an alloy, a glass, a ceramic, a rubber and a resin. In the composite material according to the present invention, a general amount, in the art can be adopted as the amount of the negative thermal expansion material of the present invention added.

EXAMPLES

Hereinafter, the present invention will be described in more detail with reference to Examples. However, the scope of the present invention is not intended to be limited by these Examples.

<Evaluation Apparatus>
1. X-ray diffractometry: The X-ray diffractometry of zirconium tungsten phosphate and a reaction precursor employed Ultima IV from Rigaku Corp, Cu-Kα was used as a radiation source. The measurement conditions were set to a tube voltage of 40 kV, a tube current of 40 mA, and a scanning rate of 0.1°/sec.
2. Infrared absorption spectrum (FT-IR) analysis: The infrared absorption spectrum analysis of a reaction precursor employed NICOLET 6700 manufactured by Thermo Fisher Scientific Inc. The measurement was performed under conditions of a resolution of 4 $cm^{-1}$, the number of scans of 256, and a measurement wavenumber region of 400 $cm^{-1}$ to 4000 $cm^{-1}$. ATR measurement was performed, followed by ATR correction and spectrum smoothing treatment.
3. Average particle size: The average particle sizes of each starting material and solid matter in slurry were measured by the laser diffraction/scattering method using Microtrac MT3300EXII particle size analyzer (manufactured by MicrotracBEL Corp).

<Negative Thermal Expansion Material>

Reference Example 1

15 parts by mass of commercially available tungsten trioxide ($WO_3$; average particle size: 1.2 μm) were placed in a beaker. 84 parts by mass of pure water were further added to the beaker. 1 part by mass of polycarboxylic acid ammonium salt was added thereto as a dispersant.

The mixture was stirred at room temperature (25° C.) for 120 minutes using a three-one motor stirrer to prepare shiny containing 15% by mass of the tungsten trioxide. The average particle size of solid matter in the slurry was 1.2 μm.

Subsequently, to this slurry, zirconium hydroxide and an aqueous solution containing 85% by mass of phosphoric acid were added at room temperature (25° C.) so as to attain a Zr:W:P molar ratio of 2.00:1.00:2.00 in the slurry. The reaction was performed with stirring for 2 hours.

After the completion of the reaction, the total amount of the slurry was dried at 200° C. for 24 hours in the atmosphere to obtain a reaction precursor. As a result of conducting X-ray diffraction on the obtained reaction precursor, only the diffraction peaks of the tungsten trioxide were observed (see FIG. 1). As a result of conducting FT-IR analysis, the reaction precursor had an infrared absorption peak at 950 to 1150 $cm^{-1}$, and the maximum value of the infrared absorption peak in this region appeared at 1027 $cm^{-1}$ (see FIG. 2(a) to 2(d)).

Subsequently, the obtained reaction precursor was subjected to calcination reaction at 1050° C. over 2 hours in the atmosphere to obtain a white calcined product.

As a result of subjecting the obtained calcined product to X-ray diffractometry, the calcined product was single-phase $Zr_2(WO_4)(PO_4)_2$. This product was subjected to milling treatment in a jet milling machine to obtain a negative thermal expansion material sample.

Example 1

15 parts by mass of commercially available tungsten trioxide ($WO_3$; average particle size: 1.2 μm) were placed in a beaker. 84 parts by mass of pure water were further added to the beaker.

The mixture was stirred at room temperature (25° C.) for 120 minutes to prepare slurry containing 15% by mass of the tungsten trioxide. The average particle size of solid matter in the slurry was 1.2 μm.

Subsequently, to this slurry, zirconium hydroxide, an aqueous solution containing 85% by mass of phosphoric acid, and magnesium hydroxide were added at room, temperature (25° C.) so as to attain a Zr:W:P:Mg molar ratio of 2.00:1.00:2.00:0.1 in the slurry. Then, the mixture was heated to 80° C., and the reaction was performed with stirring for 4 hours.

After the completion of the reaction, 1 part by mass of polycarboxylic acid ammonium salt was added thereto as a dispersant. The slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 μm.

Figure 3:
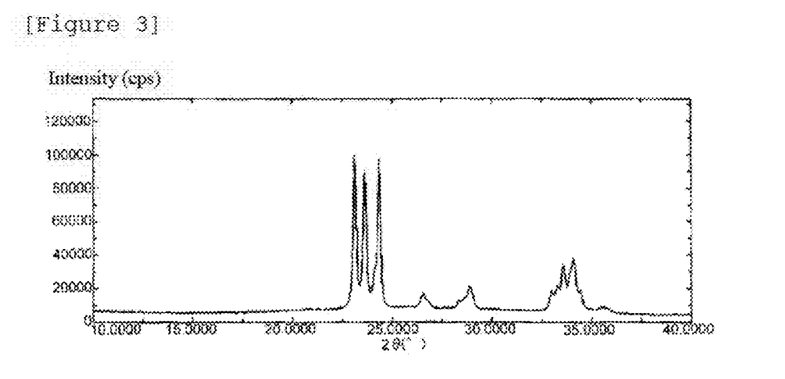
FIG. 3 is an X-ray diffraction diagram of a reaction precursor obtained in Example 1.
Figure 4:
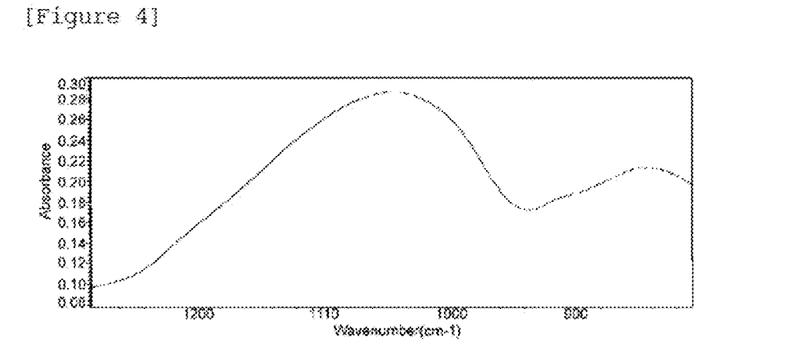
FIG. 4 is a FT-IR spectrum chart of the reaction precursor obtained in Example 1.
Figure 5:
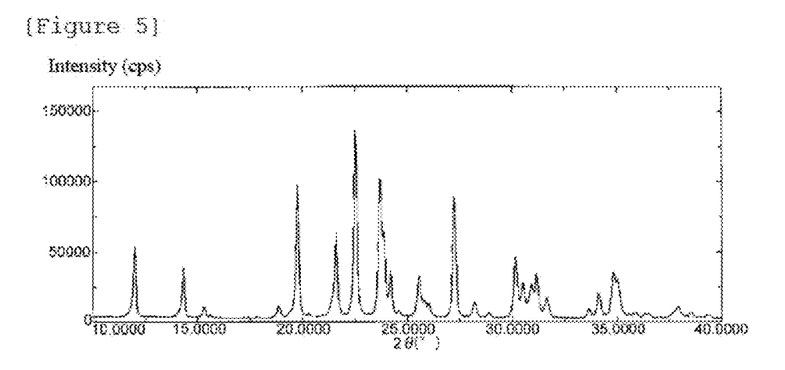
FIG. 5 is an X-ray diffraction diagram of zirconium tungsten phosphate obtained in Example 1.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed (see FIG. 3). As a result of conducting FT-IR analysis, the reaction precursor had an infrared absorption peak at 950 to 1150 $cm^{-1}$, and the maximum value of the infrared absorption peak in this region appeared at 1042 $cm^{-1}$ (see FIG. 4).

Subsequently, the obtained reaction precursor was subjected to calcination reaction at 1050° C. over 2 hours in the atmosphere to obtain a white calcined product.

As a result of subjecting the obtained calcined product to X-ray diffractometry, the calcined product was single-phase $Zr_2(WO_4)(PO_4)_2$. This product was used as a negative thermal expansion material sample.

Example 2

15 parts by mass of commercially available tungsten trioxide ($WO_3$; average particle size: 1.2 μm) were placed in a beaker. 84 parts by mass of pure water were further added to the beaker. 1 part by mass of polycarboxylic acid ammonium salt was added thereto as a dispersant.

The mixture was stirred at room temperature (25° C.) for 120 minutes to prepare slurry containing 15% by mass of the tungsten trioxide. The average particle size of solid matter in the slurry was 1.2 μm.

Subsequently, to this slurry, zirconium hydroxide, an aqueous solution containing 85% by mass of phosphoric acid, magnesium hydroxide, and divanadium pentoxide were added at room temperature (25° C.) so as to attain a Zr:W:P:Mg:V molar ratio of 2.00:1.00:2.00:0.1:0.05 in the slurry. Then, the mixture was heated to 80° C., and the reaction was performed with stirring for 4 hours.

After the completion of the reaction, the slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 μm.

Subsequently, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 $cm^{-1}$, and the maximum value of the infrared absorption peak in this region appeared at 1030 $cm^{-1}$.

Subsequently, the obtained reaction precursor was subjected to calcination reaction at 1050° C. over 2 hours in the atmosphere to obtain a white calcined product.

As a result of subjecting the obtained calcined product to X-ray diffractometry, the calcined product was single-phase $Zr_2(WO_4)(PO_4)_2$. This product was used as a negative thermal expansion material sample.

Example 3

15 parts by mass of commercially available tungsten trioxide ($WO_3$; average particle size: 1.2 μm) were placed in a beaker. 84 parts by mass of pure water were further added to the beaker.

The mixture was stirred at room temperature (25° C.) for 120 minutes to prepare slurry containing 15% by mass of the tungsten trioxide. The average particle size of solid matter in the slurry was 1.2 μm.

Subsequently, to this slurry, zirconium, hydroxide and an aqueous solution, containing 85% by mass of phosphoric acid were added at, room temperature (25° C.) so as to attain a Zr:W:P molar, ratio of 200:1.00:2.00 in the slurry. Then, the mixture was heated to 80° C., and the reaction was performed with stirring for 4 hours.

After the completion of the reaction, 1 part, by mass of polycarboxylic acid ammonium salt was added thereto as a dispersant. The slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 µm.

Subsequently, the slurry was supplied at a supply rate of 2.4 L/h to a spray dryer set to 220° C. to obtain a reaction precursor. As a result, of conducting X-ray diffraction on the obtained reaction precursor, only the diffraction peaks of the tungsten trioxide were observed. As a result of conducting FT-IR analysis, the reaction precursor had an infrared absorption peak at 950 to 1150 $cm^{-1}$, and the maximum value of the infrared absorption peak in this region appeared at 1042 $cm^{-1}$.

Subsequently, the obtained reaction precursor was subjected to calcination reaction at 1220° C. over 8 hours in the atmosphere to obtain a white calcined product.

As a result of subjecting the obtained calcined product to X-ray diffractometry, the calcined product was single-phase $Zr_2(WO_4)(PO_4)_2$. This product was used as a negative thermal expansion material sample.

Reference Example 2

15 parts by mass of commercially available tungsten trioxide ($WO_3$; average particle size: 25 µm) were weighed and placed in a tank. 84 parts by mass of pure water and 1 part by mass of polycarboxylic acid ammonium salt as a dispersant were added to the tank.

Subsequently, the slurry was supplied with stirring to a media stirring-type bead mill equipped with zirconia beads having a diameter of 0.5 mm, and wet-milled by mixing for 15 minutes. The average particle size of solid matter in the slurry thus wet-milled was 0.3 µm.

Subsequently, to this slurry, zirconium hydroxide and an aqueous solution containing 85% by mass of phosphoric acid were added at room temperature (25° C.) so as to attain a Zr:W:P molar ratio of 2.00:1.00:2.00 in the slurry. Then, the reaction was performed with stirring for 2 hours.

After the completion of the reaction, the slurry was supplied at a supply rate of 2.4 L/h to a spray dryer set to 220° C. to obtain a reaction precursor. As a result of conducting X-ray diffraction on the obtained reaction precursor, only the diffraction peaks of the tungsten trioxide were observed. As a result of conducting FT-IR analysis, the reaction precursor had an infrared absorption peak at 950 to 1150 $cm^{-1}$, and the maximum value of the infrared absorption peak in this region appeared at 1030 $cm^{-1}$.

Subsequently, the obtained reaction precursor was subjected to calcination, reaction at 1050° C. over 2 hours in the atmosphere to obtain a white calcined product.

As a result of subjecting the obtained calcined product to X-ray diffractometry, the calcined product was single-phase $Zr_2(WO_4)(PO_4)_2$. This product was used as a negative thermal expansion material sample.

<Physical Property Evaluation>

Figure 6A:
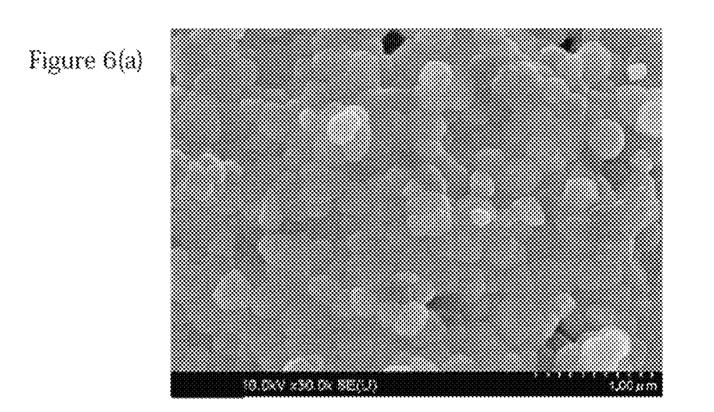
FIG. 6(a) is a SEM photograph (magnification: ×30000) of the zirconium tungsten phosphate obtained in Example 1.
Figure 6B:
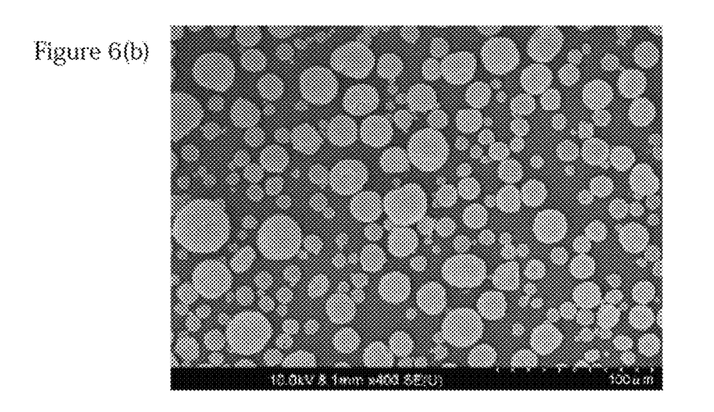
FIG. 6(b) is the same SEM photograph as in FIG. 6(a) (except for a magnification of ×400).

The content of a subcomponent element, the degree of sphericity, the average primary particle size, the average secondary particle size (aggregate particle size), the BET specific surface area, the tap density, the bulk density, the angle of repose and the thermal expansion coefficient were measured for the zirconium tungsten phosphate obtained in each of Examples and Reference Examples. The results are shown in Table 1. The SEM photograph of the zirconium tungsten phosphate obtained in Example 1 is shown in FIGS. 6(a) and 6(b).

(Measurement of Average Primary Particle Size)

The average primary particle size of the zirconium tungsten phosphate was determined from an average value of 50 or more particles arbitrarily extracted with a magnification of ×5000 in scanning electron microscope observation. The particle size, was defined as the largest traverse length of each particle.

(Measurement of Average Secondary Particle Size)

The average secondary particle size of the zirconium tungsten phosphate was determined from an average value of 50 or more particles arbitrarily extracted with a magnification of ×400 in scanning electron microscope observation. The particle size was defined as the largest traverse length of each particle.

(Measurement of Degree of Sphericity)

The degree of sphericity was determined according to the following calculation expression as to 50 particles arbitrarily extracted with a magnification of ×400 using an image analysis apparatus LUZEX (manufactured by NIRECO Corp.):

Degree of sphericity=Equivalent surface area diameter/Circumscribed circle diameter Equivalent surface area diameter: the diameter of a circle whose circumference corresponds to the perimeter of a particle Circumscribed circle diameter: the longest diameter of the particle (Measurement of Bulk Density)

In conformity with JIS 5101-12-1 Test methods for pigments, a sample was received by a receiver (capacity: 30 mL) of a bulk specific gravity measuring instrument (Kuramochi Kagaku Kikai Seisakusho K. K.) until the receiver overflowed with the sample through a sieve. The excess was swept off with a spatula. The mass of the sample accumulated in the receiver was measured, and the bulk density (g/mL) was calculated.

(Evaluation of Tap Density)

10 g of a sample powder whose mass was measured in advance was added to a graduated cylinder using a funnel. The graduated cylinder was loaded in a tapping apparatus (DUAL AUTOTAP manufactured by Quantachrome Instruments). The measurement conditions were set to the number of taps of 500, a tapping height of 3.2 mm, and a tapping pace of 200 taps/min. The tap density was determined according to the following expression (conforming to ASTM: B527-93, 85):

Tap density=Powder mass/Volume after tapping (Evaluation of Angle of Repose)

The angle of the pile of a powder layer formed by free fall according to the sample injection method was measured using a powder tester (model PT-N manufactured by Hosokawa Micron Group).

(Contents of Subcomponent Elements Mg and V)

The content of each subcomponent element was measured using a wavelength-dispersive fluorescent X-ray analysis apparatus (Rigaku Corp., model ZSX100e).

(Evaluation of Thermal Expansion Coefficient)

In an XRD apparatus (Rigaku Corp., Ultima IV) equipped with a heating function, lattice constants for the a, b, and c axes of a sample were measured 10 minutes after the temperature reached the target at a heating rate of 20° C./min. The lattice constants were linearly converted to change in lattice volume (rectangular parallelepiped), and the thermal expansion coefficient was determined (see J. Mat. Sci., 35 (2000) 2451-2454).

TABLE 1

| | | Example 1 | Example 2 | Example 3 | Reference Example 1 | Reference Example 2 |
|---|---|---|---|---|---|---|
| Subcomponent element | Mg content (% by mass) | 0.4 | 0.4 | — | — | — |
| | V content (% by mass) | — | 0.4 | — | — | — |
| Character of particle | | Spherical aggregate | Spherical aggregate | Spherical aggregate | Granular monodispersed particle | Spherical aggregate |
| Degree of sphericity | | 1 | 1 | 1 | 0.88 | 0.99 |
| Average primary particle size (μm) | | 0.3 | 0.6 | 0.5 | 0.6 | 0.3 |
| Average secondary particle size (μm) | | 16 | 16 | 16 | — | 17 |
| BET specific surface area (m$^2$/g) | | 0.5 | 0.3 | 0.3 | 3.0 | 3.1 |
| Tap density (g/ml) | | 1.9 | 2.0 | 2.0 | 1.0 | 1.7 |
| Bulk density (g/ml) | | 1.34 | 1.33 | 1.33 | 0.65 | 1.2 |
| Angle of repose (°) | | 45 | 44 | 44 | 52 | 47 |
| Linear expansion coefficient (/° C.) | | $-3 \times 10^{-6}$ | $-3 \times 10^{-6}$ | $-3 \times 10^{-6}$ | $-3 \times 10^{-6}$ | $-3 \times 10^{-6}$ |

<Preparation of Resin Composite>

Example 4

5.8 g of the negative thermal expansion material sample obtained in Example 1 and 4.2 g of liquid epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HAAKE MARS II manufactured by Thermo Fisher Scientific Inc.).

100 μL of a curing agent (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient was measured from 30 to 120° C. at a heating rate of 1° C./min using a thermomechanical analysis apparatus (TMA).

Example 5

5.8 g of the negative thermal expansion material sample obtained in Example 2 and 4.2 g of epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HAAKE MARS II manufactured by Thermo Fisher Scientific Inc.).

100 μL of a curing agent (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient was measured from 30 to 120° C. at a heating rate of 1° C./min using a thermomechanical analysis apparatus (TMA).

Example 6

5.8 g of the negative thermal expansion material: sample obtained in Example 3 and 4.2 g of liquid epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HAAKE MARS II manufactured by Thermo Fisher Scientific Inc.).

100 μL of a curing agent (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient was measured from 30 to 120° C. at a heating rate of 1° C./min using a thermomechanical analysis apparatus (TMA).

Reference Example 3

5.8 g of the negative thermal expansion material obtained, in Reference Example 1 and 4.2 g of epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HAAKE MARS II manufactured by Thermo Fisher Scientific Inc.).

100 μL of a curing agent. (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient, was measured from 30 to 120° C. at a heating rate of 1° C./min using a thermomechanical analysis apparatus (TMA).

Reference Example 4

5.8 g of the negative thermal expansion material obtained in Reference Example 2 and 4.2 g of epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HAAKE MARS II manufactured by Thermo Fisher Scientific Inc.).

100 µL of a curing agent (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient was measured from 30 to 120° C. at a heating rate of 1° C./min using a thermomechanical analysis apparatus (TMA).

Reference Example 5

3.3 g of spherical molten silica (linear expansion coefficient: $5\times10^{-7}$/° C.) having an average particle size of 10 µm and 4.2 g of epoxy resin (Mitsubishi Chemical Corp., jER807, epoxy equivalent: 160 to 175) were weighed and mixed at the number of rotations of 2000 rpm in a vacuum mixer (AWATORI RENTARO ARV-310 manufactured by Thinky Corp.) to prepare 30 vol % of a paste.

The viscosity of this paste was measured at 25° C. at shear rates of 1 [l/s] and 10 [l/s] using a rheometer (HARKS MARS II manufactured by Thermo Fisher Scientific Inc.).

100 µL of a curing agent (CURESOL manufactured by Shikoku Chemicals Corp.) was added to the paste, which was then mixed at the number of rotations of 1500 rpm in a vacuum mixer (AWATORI RENTARO ARV-310 manufactured by Thinky Corp.) and cured at 150° C. over 1 hour to obtain a resin composite. This resin composite was cut into 5 mm square×10 mm. The linear expansion coefficient was measured from 30 to 120° C. at a heating rate of 1° C./min using a thermomechanical analysis apparatus (TMA).

viscosity of a resin low during shape forming even when blended with the resin, as compared with Reference Examples 1 and 2, and permits shape forming with a viscosity almost equivalent to molten silica (Reference Example 5).

The invention claimed is:

1. A negative thermal expansion material comprising spherical zirconium tungsten phosphate having a BET specific surface area of 0.01 to 2 m²/g,
   wherein a degree of sphericity of the spherical zirconium tungsten phosphate is 0.90 or more and 1 or less,
   wherein the degree of sphericity is calculated by a calculation expression (1) below:

Degree of sphericity=Equivalent surface area diameter/Circumscribed circle diameter  (1)

wherein the equivalent surface area diameter and the circumscribed circle diameter are obtained by an image analysis processing of 50 particles arbitrarily extracted of a sample of the spherical zirconium tungsten phosphate observed under an electron microscope with a magnification of ×400,
   wherein the equivalent surface area diameter is a diameter of a circle whose circumference corresponds to a perimeter of a particle,
   wherein the circumscribed circle diameter corresponds to the longest diameter of the particle.

2. The negative thermal expansion material according to claim 1, further containing Mg and/or V as a subcomponent element.

3. The negative thermal expansion material according to claim 1, wherein a content of a subcomponent element is 0.1% by mass or more and 3% by mass or less.

4. The negative thermal expansion material according to claim 1, wherein a subcomponent element is Mg and/or V.

5. The negative thermal expansion material according to claim 1, wherein an average particle size of the spherical zirconium tungsten phosphate is 1 µm or larger and 50 µm or smaller.

6. The negative thermal expansion material according to claim 1, wherein a tap density of the spherical zirconium tungsten phosphate is a 1.3 g/ml or larger.

7. The negative thermal expansion material according to claim 1, wherein the spherical zirconium tungsten phosphate is particle aggregates which are secondary particles formed by the gathering of primary particles.

8. The negative thermal expansion material according to claim 7, wherein the BET specific surface area is 0.01 to 1.2 m²/g.

TABLE 2

|   | Type of negative thermal expansion material | Viscosity [Pa · s] @ shear rate of 1 [1/s] | Viscosity [Pa · s] @ shear rate of 10 [1/s] | Linear expansion coefficient of resin composite (/° C.) |
|---|---|---|---|---|
| Example 4 | Example 1 | 18 | 16 | $30 \times 10^{-6}$ |
| Example 5 | Example 2 | 16 | 14 | $29 \times 10^{-6}$ |
| Example 6 | Example 3 | 18 | 17 | $30 \times 10^{-6}$ |
| Reference Example 3 | Reference Example 1 | 247 | 221 | $32 \times 10^{-6}$ |
| Reference Example 4 | Reference Example 2 | 308 | 210 | $31 \times 10^{-6}$ |
| Reference Example 5 | Molten silica | 17 | 15 | $40 \times 10^{-6}$ |

As is evident from the results of Table 2, the negative thermal expansion materials of Examples 1, 2 and 3 keep the 9. A paste comprising a negative thermal expansion material according to claim 1.

10. A composite material comprising a negative thermal expansion material according to claim 1 and a positive thermal expansion material.

11. The composite material according to claim 10, wherein the positive thermal expansion material is at least one member selected from the group consisting of a metal, an alloy, a glass, a ceramic, a rubber and a resin.

* * * * *